Oct. 21, 1924.

R. C. PIERCE

TIRE BEAD REENFORCEMENT

Filed Nov. 10, 1923

1,512,796

Inventor
ROBERT C. PIERCE.

By
Attorney

Patented Oct. 21, 1924.

1,512,796

UNITED STATES PATENT OFFICE.

ROBERT C. PIERCE, OF BELLEVILLE, NEW JERSEY, ASSIGNOR TO JOHN R. GAMMETER, OF AKRON, OHIO.

TIRE-BEAD REENFORCEMENT.

Application filed November 10, 1923. Serial No. 673,903.

*To all whom it may concern:*

Be it known that I, ROBERT C. PIERCE, a citizen of the United States, residing at Belleville, in the county of Essex, State of New Jersey, have invented certain new and useful Improvements in Tire-Bead Reenforcements, of which the following is a specification.

This invention relates to the reenforcement of the beads of pneumatic tires, particularly of the type known as straight-side tires which have inextensible beads. It has been customary to embody in the beads of such tires metallic reenforcements of various kinds including flat tapes which have been made in various ways and of various constructions. It should be understood that such wire reenforcement is embodied in a mass of rubber or filler material which may be vulcanized or otherwise treated so as to form a ring of desired cross-section, which is often more or less triangular, which bead is then embodied in the tire or casing.

This invention relates to a wire tape reenforcement for tire beads which consists of a plurality of parallel wires preferably of hardened steel having great tensile strength and which are practically inextensible and which are held in parallel relation to each other by a weft or filler wire made of relatively soft and yieldable metal. Among the objects of my invention is greater ease and rapidity in the manufacture of this reenforcement as compared with previous reenforcements, greater tensile strength, less liability to cut or bend any of the elements composing the reenforcement, and a more complete meeting of the requirements of service, including flexibility without extensibility.

In the drawings which disclose one embodiment of the invention:

As shown, the tire bead is indicated by the numeral 1 and the reenforcement by the numeral 2. It is composed of a number of parallel wires 3—3 which are preferably made of hard steel of great tensile strength to render the reenforcement inextensible. With this in view these longitudinal wires are usually made of relatively high carbon steel for the purpose of giving the desired tensile strength and rendering the reenforcement inextensible. These longitudinal members 3—3 are held in parallel relation by means of a weft or filler wire 4 which is passed under and over the longitudinal wires from side to side of the tape. This weft or filler wire is made of soft metal, preferably annealed steel or copper which is easily flexed in any direction.

Figure 4:
Fig. 4 is a cross-section along the line 4—4 of Fig. 1 of the tire bead reenforcement.
Figure 5:
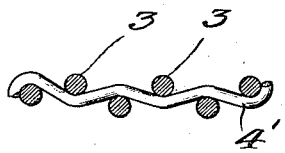
Fig. 5 is a cross-section along the same line 4—4 of Fig. 1 of a tire bead reenforcement in which the weft or filler member is composed of hard wire.

By using a soft filler wire 4 instead of a hard wire such as is used in the longitudinal strands 3—3, the process of weaving the tape can be conducted with greater rapidity and with less danger of breaking the filler wire. The tape as a whole will also be more flexible laterally than if the filler wire were made of hard metal. Where soft and easily bendable wire is used for the filler, the longitudinal strands may be held all practically in the same plane, which will be accomplished by denting or bending the soft filler wire, as is illustrated in Fig. 4; whereas if a hard filler wire 4' be used, the longitudinal strands 3—3 may be forced into different planes at the points where they pass respectively over and under the filler wire, and when heavy tension is brought upon the longitudinal strands, there will be danger of these strands parting at points where they pass over a hard filler wire, which danger is avoided by the use of a soft weft or filler wire. Practical tests have demonstrated that both the tensile strength and the elastic limit of a woven tape of the construction shown in Figs. 1 and 4 having soft filler wire are very much in excess of the tensile strength and the elastic limit of the tape of the construction shown in Fig. 5 having a hard filler wire. The importance of having the filler wire of soft and bendable material rather than of hard material is shown by the fact that during practical tests of reinforcing tape having the construction of Fig. 1 with the hard filling wire, the longitudinal strands invariably parted at the points where such strands crossed the hard filler wire. It is obvious that modifications may be made in the details and the method of constructing the tire bead reenforcement above described, and that instead of a continuous weft or filler wire as shown in the drawings other suitable means of a soft and easily bendable nature may be employed for holding the parallel wires in the desired relation to each other. It will be seen that this tire bead reenforcement consisting of a number of parallel longitudinal strands of wire held in parallel relation by a weft or filler wire of soft and easily bendable material possesses in a high degree the desirable characteristics of non-extensibility coupled with flexibility and with a reduction to a minimum of danger of parting of the longitudinal wires when under tension. It will also be seen that rapidity and consequent cheapness in manufacture is made possible by the use of the soft filler wire and that the tensile strength of the reenforcement as a whole is thereby greatly increased.

Figure 1:
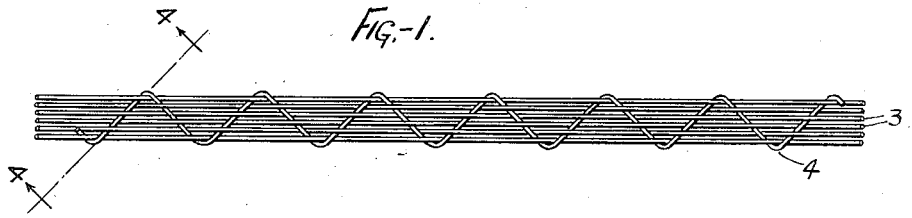
Figure 1 is a plan view of a strip of such reenforcement.
Figure 2:
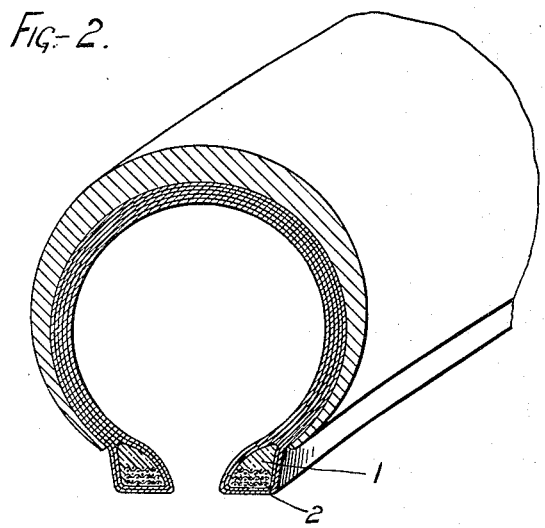
Fig. 2 is a view partly in elevation and partly in cross-section of the tire with the tire bead reenforcement in position therein.
Figure 3:
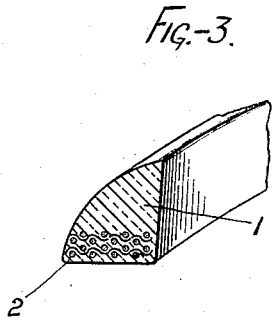
Fig. 3 is a view partly in side elevation and partly in cross-section of a tire bead enlarged prior to its incorporation in the tire.

In the manufacture of the tire bead, the wire tape shown in Fig. 1 is laid up in a plurality of convolutions sufficient to give the necessary strength to the bead. The material constituting the rest of the bead 1 is then molded around the reenforcement in any suitable manner as practised in the art, and the bead is ready for incorporation in the tire carcass.

What is claimed is:

1. A tire bead reenforcement consisting of a plurality of parallel wires and a relatively soft and bendable cross member to hold the wires in parallel relation.

2. A tire bead reenforcement consisting of a plurality of strands of wires extending circumferentially and parallel with each other and held in such relation by means of a soft and easily bendable member woven through said parallel wires.

3. A tire bead reenforcement consisting of a wire tape composed of a series of strands of hard wire of high tensile strength extending parallel with each other and held in such relation by means of a filler wire of relatively soft and easily bendable material.

ROBERT C. PIERCE.